US008778249B2

(12) United States Patent
Cho et al.

(10) Patent No.: US 8,778,249 B2
(45) Date of Patent: Jul. 15, 2014

(54) POROUS, CARBON-CONTAINING PREFORM AND PROCESS FOR PRODUCING THE SAME

(75) Inventors: Chaewook Cho, Tongyeong (KR); Hyunkyu Shin, Changwon (KR); Daehyun Cho, Jeonju (KR); Jonghyun Park, Jeonju (KR); Seyoon Lee, Jeonju (KR)

(73) Assignee: DACC Co., Ltd. (KR)

( * ) Notice: Subject to any disclaimer, the term of this patent is extended or adjusted under 35 U.S.C. 154(b) by 55 days.

(21) Appl. No.: 13/393,102

(22) PCT Filed: Dec. 14, 2009

(86) PCT No.: PCT/KR2009/007465
§ 371 (c)(1),
(2), (4) Date: Feb. 28, 2012

(87) PCT Pub. No.: WO2011/027947
PCT Pub. Date: Mar. 10, 2011

(65) Prior Publication Data
US 2012/0156460 A1   Jun. 21, 2012

(30) Foreign Application Priority Data

Sep. 2, 2009  (KR) .................. 10-2009-0082415

(51) Int. Cl.
*B32B 5/06*     (2006.01)
*B32B 7/02*     (2006.01)
*D04H 1/498*    (2012.01)
*F16D 69/02*    (2006.01)
*D04H 1/4242*   (2012.01)
*F16D 69/00*    (2006.01)

(52) U.S. Cl.
CPC ........ *F16D 69/023* (2013.01); *F16D 2069/008* (2013.01); *D04H 1/498* (2013.01); *D04H 1/4242* (2013.01)
USPC ............................ 264/258; 28/107; 264/29.1

(58) Field of Classification Search
USPC ............................................. 264/258; 28/107
See application file for complete search history.

(56) References Cited

U.S. PATENT DOCUMENTS

| 4,790,052 | A | * | 12/1988 | Olry .............................. 28/110 |
| 5,869,411 | A | * | 2/1999 | Bazshushtari et al. ........ 442/340 |
| 6,183,583 | B1 | | 2/2001 | Duval et al. |
| 6,767,602 | B1 | | 7/2004 | Duval et al. |

FOREIGN PATENT DOCUMENTS

| JP | H05230748 | 9/1993 |
| JP | 2000108804 | 4/2000 |
| JP | 2001501572 | 2/2001 |
| JP | 2006089340 | 4/2006 |
| KR | 10-2000-0048719 | 7/2000 |
| KR | 10-2004-0060017 | 7/2004 |

OTHER PUBLICATIONS

International Search Report—PCT/KR2009/007465 dated Aug. 5, 2010.

* cited by examiner

*Primary Examiner* — Matthew Daniels
(74) *Attorney, Agent, or Firm* — Cantor Colburn LLP

(57) ABSTRACT

There is provided a porous, carbon-containing preform, including a body (CL) of unidirectional carbon fiber fabrics (C1), and a friction layer (FL) of randomly-arranged-carbon-fiber fabrics (F1), combined with the body (CL) by a needle-punching operation. According to the present invention, it is by the needle-punching operation that the friction layer (FL) of the randomly-arranged-carbon fiber fabric (F1) is formed on the body (CL) of the unidirectional carbon fiber fabric (C1) and the friction layer (FL) of the randomly-arranged-carbon-fiber (F1) is cross-linked to the body (CL) of the unidirectional carbon fiber fabric (C1) in producing the porous, carbon-containing preform.

2 Claims, 4 Drawing Sheets

POROUS, CARBON-CONTAINING PREFORM AND PROCESS FOR PRODUCING THE SAME

TECHNICAL FIELD

The present invention relates to a porous, carbon-containing preform.

BACKGROUND ART

A brake for an automotive falls into two categories: a drum brake and a disc brake.

The disc brake includes a disc and pads. The disc brake decelerates or stops a moving automotive by forcing the pads against the rotating disc. Braking action converts kinetic energy into heat. This requires the disc and pad to be made of a material which is lightweight, heat-resistant, erosion-resistant, wear-resistant, and high in strength and to have high coefficients of friction. In this respect, silicon-infiltrated, carbon fiber-reinforced carbon is a material suitable for producing the disc and pad.

The disc, made of silicon-infiltrated, carbon fiber-reinforced carbon, is hereinafter referred to as the "carbon-ceramic brake disc"

A process for producing a carbon-ceramic brake disc largely includes a first step of producing a porous, carbon-containing preform, a second step of densifying the porous, carbon-containing preform with a carbon matrix, a third step of forming the porous, carbon-containing preform into a green compact, a fourth step of infiltrating the green compact with silicon, and a fifth step of grinding the silicon-infiltrated green compact.

In the first step, two of the porous, carbon-containing performs are produced. The porous, carbon-containing preform is composed of a body and a friction layer.

In the second step, densification of the porous, carbon-containing preform with the carbon matrix is performed by chemical vapor infiltration or by using a liquid process.

In the third step, the two of the porous, carbon-containing preforms are combined into the green compact, with their respective bodies being opposite to each other.

In the fourth step, silicon is infiltrated into the green compact by the action of the capillary forces.

In the fifth step, the green compact is ground to a specified shape.

FIG. 1 is a block diagram illustrating a conventional method for producing a porous, carbon-containing preform.

In a first step P1 as shown in FIG. 1, a body is formed by superposing sheets of unidirectional fiber fabric on top of one another and bonding the sheets by a needle-punching operation. That is, at penetration of a needle, barbs of the needle carry with them some fibers from each sheet which the needle penetrates. As a result, the fibers carried by the barbs create vertical cross-linked bonds between the sheets of the unidirectional carbon fiber fabric, thereby forming the body.

In a second step P2, a friction layer is formed by stacking short carbon fibers and pressing stacked short carbon fibers at a specific pressure.

In a third step P3, the friction layer is bonded to the body with a binder such as a phenolic resin.

The conventional method for producing a porous, carbon-containing preform includes as many as three steps P1, P2, and P3 and provides a poor connection between the body and friction layer.

DISCLOSURE OF INVENTION

Technical Problem

One objective is to form a friction layer and a body, and combining the friction layer to the body by a needle-punching operation, without having to use a binder, in producing a porous, carbon-containing preform.

Another object is to provide a good connection between a friction layer and body of a porous, carbon-containing preform, by a needle-punching operation.

Solution to Problem

According to one aspect of the present invention, there is provided a porous, carbon-containing preform, includes a body of unidirectional carbon fiber fabrics, and a friction layer of randomly-arranged-carbon-fiber fabrics, combined with the body by a needle-punching operation.

According to another aspect of the present invention, there is provided a porous, carbon-containing preform, includes a body of unidirectional carbon fiber fabrics, an intermediate layer of the unidirectional carbon fiber fabrics and randomly-arranged-carbon-fiber fabrics, combined with the body by a needle-punching operation; and a friction layer of the randomly-arranged-carbon-fiber fabrics, combined with the intermediate layer by a needle-punching operation.

According to a further aspect of the present invention, there is provided a process for producing a porous, carbon-containing preform, including a first step of forming a body by needle-punching sheets of unidirectional carbon fiber fabric, superposed on top of one another, and a second step of forming a friction layer on the body by superposing sheets of randomly-arranged-carbon-fiber fabric on top of one another on the body and subsequently by needle-punching superposed sheets of randomly-arranged-carbon-fiber fabric and the body.

According to another aspect of the present invention, there is provided a process for producing a porous, carbon-containing preform, including a first step of forming a body by needle-punching sheets of unidirectional carbon fiber fabric, superposed on top of one another, a second step of forming an intermediate layer on the body by alternately superposing the sheet of the unidirectional carbon fiber fabric and a sheet of randomly-arranged-carbon-fiber fabric on top of one another on the body and subsequently by needle-punching alternately-superposed sheets of the unidirectional carbon fiber fabric and randomly-arranged-carbon-fiber fabric and the body, and a third step of forming a friction layer on the intermediate layer by superposing sheets of the randomly-arranged-carbon-fiber fabric on top of one another on the intermediate layer and subsequently by needle-punching superposed sheets of the randomly-arranged-carbon-fiber fabric and the intermediate layer.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Referring to the accompanying drawings, a first embodiment of a process for producing a porous, carbon-containing preform according to the present invention is now described.

Figure 1:
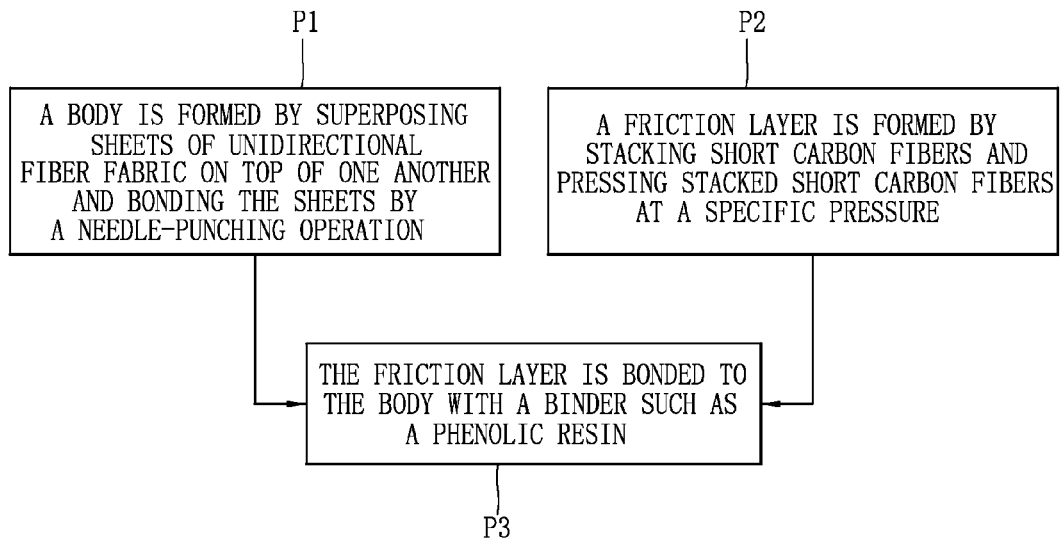
FIG. 1 is a block diagram illustrating a conventional method for producing a porous, carbon-containing preform.
Figure 2:
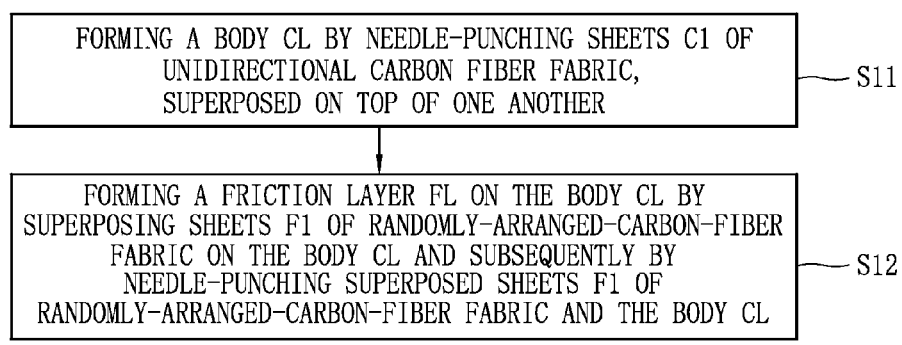
FIG. 2 is a flow chart illustrating a first embodiment of a process for producing a porous, carbon-containing preform according to the present invention.

FIG. 2 is a flow chart illustrating a first embodiment of a process for producing a porous, carbon-containing preform according to the present invention. FIGS. 3A through 3F are views illustrating first and second steps of FIG. 2. Black areas, shown in FIGS. 3C through 3F, indicate that fibers carried by barbs of a needle at penetration of the needle create vertical cross-linked bonds between sheets of the unidirectional carbon fiber fabric, between the sheets of the unidirectional carbon fiber fabric and sheets of randomly-arranged-carbon-fiber fabric, and between the unidirectional carbon fiber fabric.

As shown in FIG. 2, the first embodiment of the process for producing a porous, carbon-containing preform, including a first step S11 of forming a body CL by needle-punching sheets C1 of unidirectional carbon fiber fabric, superposed on top of one another, and a second step S12 of forming a friction layer FL on the body CL by superposing sheets F1 of randomly-arranged-carbon-fiber fabric on the body CL and subsequently by needle-punching superposed sheets F1 of randomly-arranged-carbon-fiber fabric and the body CL.

A first step S11 is now described.

Figure 3:
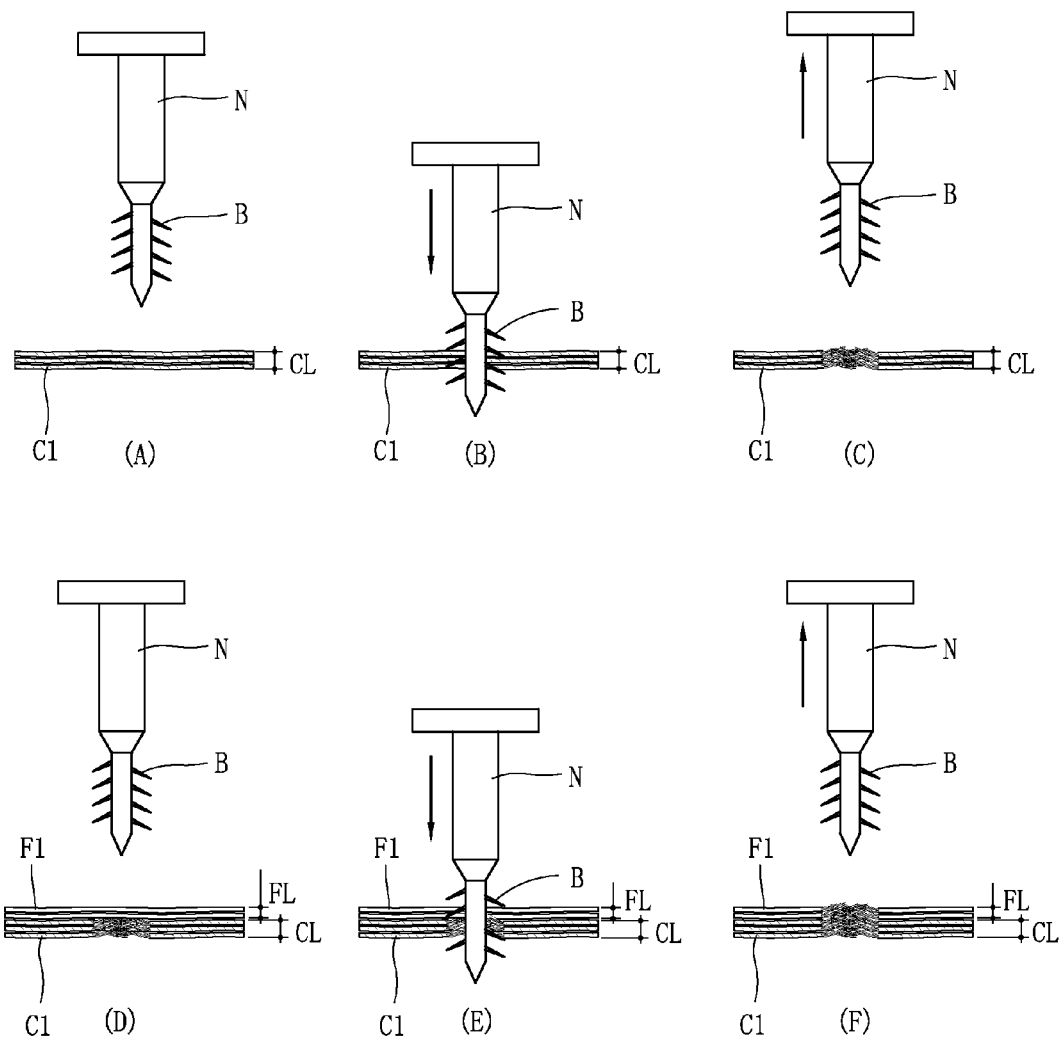
FIGS. 3A through 3F are views illustrating first and second steps of FIG. 2.

As shown in FIG. 3A, three of the unidirectional carbon fiber fabric C1 are superposed on top of one another. 1,000 to 32,000 of carbon fibers arranged in one direction are woven into one (1) sheet C1 of the unidirectional carbon fiber fabric. The unidirectional carbon fiber fabric is made of polyacrylonitryle (P.A.N or oxi-P.A.N) fiber.

As shown in FIG. 3B, the needle-punching is carried out on the three of the superposed sheets of the unidirectional carbon fiber fabric. One (1) needle N has eight barbs B, each being inclined downward.

At penetration of the needle N, the barbs B of the needle N carry with them some fibers from each sheet which the needle N penetrates. As a result, the fibers carried by the barbs B create vertical cross-linked bonds between the three (3) sheets C1 of the unidirectional carbon fiber fabric, thereby forming the body CL. The body CL has a density of 0.1~1.0 g/cm$^3$.

As shown in FIG. 3C, the needle N, when moving up from the three (3) sheets C1 of the unidirectional carbon fiber fabric, is not clogged with the fibers. This is because the barbs B of the needle N are inclined downward.

The number of the sheets C1 of the unidirectional carbon fiber fabric to be superposed on top of one another depends upon the structure to be produced. So, either each time four or more sheets C1 are superposed on top of one another, or each time one (1) sheet C1 is superposed on top of the preceding one, the needle-punching may be carried out on the superposed sheets C1. The needle-punching may be carried out two or more times on the superposed sheets C1.

The second step S12 is now described.

As shown in FIG. 3D, two (2) sheets F1 of randomly-arranged-carbon-fiber fabric are superposed on the body CL. The randomly-arranged-carbon-fiber fabric F1 is obtained by weave randomly-arranged carbon filament rovings. The carbon filament roving is formed by placing tows of polyacrylonitryle (P.A.N or oxi-P.A,N) fiber one next to the other.

As shown in FIG. 3E, during a needle-punching operation, the needle N penetrates the two (2) of the superposed sheets F1 of the randomly-arranged-carbon-fiber fabric and the three (3) sheets C1 of the unidirectional carbon fiber fabric that makes up the body CL.

At penetration of the needle N, the barbs B of the needle N carry with them some fibers from each of the two (2) sheets F1 of the randomly-arranged-carbon-fiber fabric and the three (3) sheets C1 of the unidirectional carbon fiber fabric which the needle N penetrates. As a result, the fibers carried by the barbs B create vertical cross-linked bonds between the two (2) sheets F1, thereby forming the friction layer FL. Furthermore, the fibers carried by the barbs B create vertical cross-linked bonds between the friction layer FL and body CL. The friction layer FL has a density of 0.01~0.5 g/cm$^3$.

The number of the sheets F1 of the randomly-arranged-carbon-fiber fabric to be superposed on top of one another depends upon the structure to be produced. So, either each time three (3) or more sheets F1 are superposed on top of one another on the body CL, or each time one (1) sheet F1 is superposed on top of the preceding one on the body CL, the needle-punching may be carried out on the superposed sheets F1 and the body. The needle-punching may be carried out two or more times on the superposed sheets F1 and the body CL.

As shown in FIG. 3F, the needle N, when moving up from the two (2) sheets F1 of the randomly-arranged-carbon-fiber fabric and the three (3) sheets C1 of the unidirectional carbon fiber fabric, is not clogged with the fibers. This is because the barbs B of the needle N are inclined downward.

Figure 4:
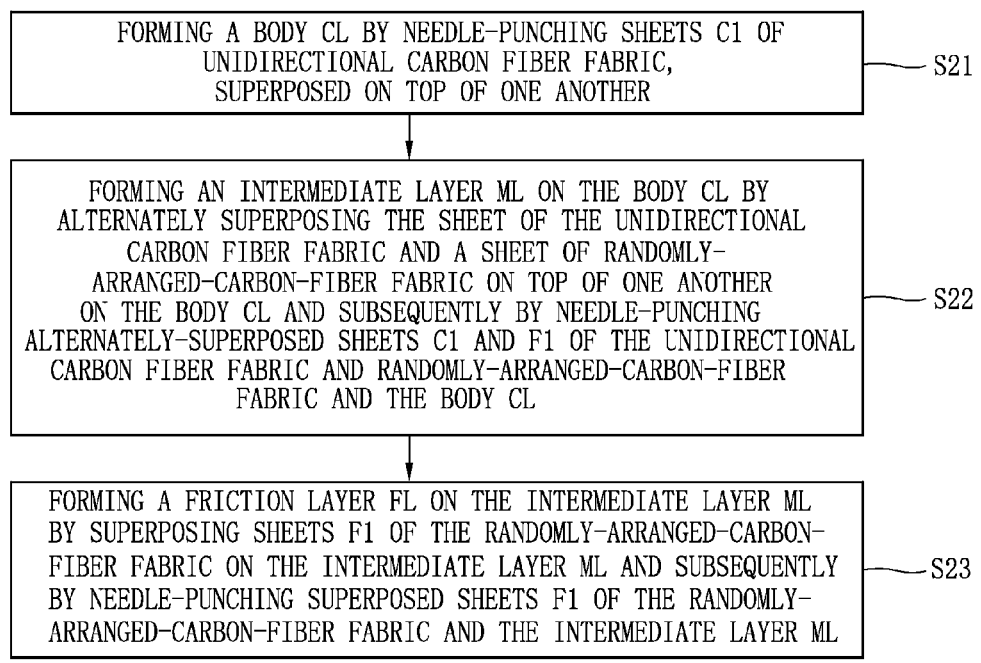
FIG. 4 is a flow chart illustrating a second embodiment of a process for producing a porous, carbon-containing preform according to the present invention.
Figure 5:
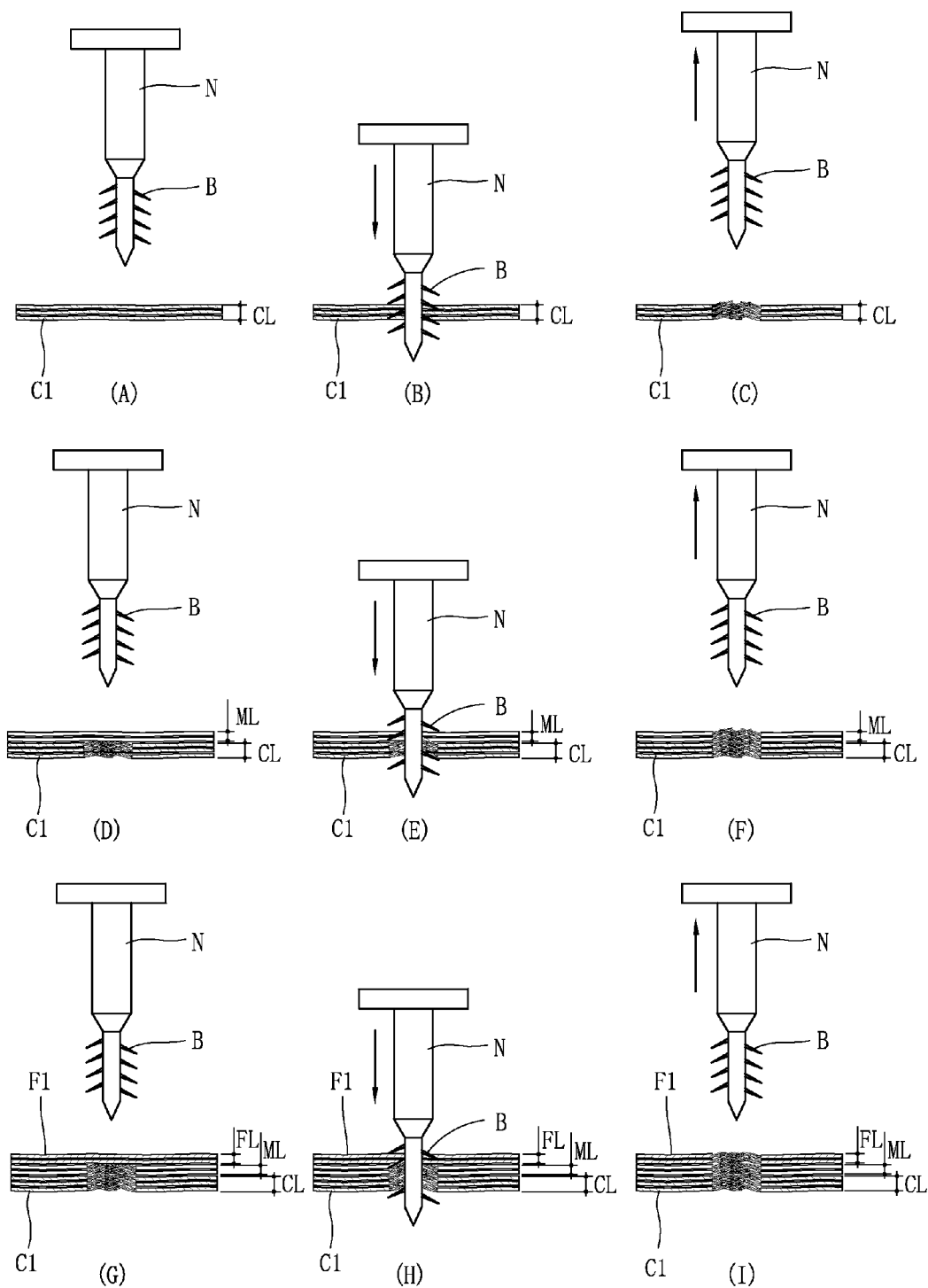
FIGS. 5A through 5I are views illustrating first, second, and third steps of FIG. 4.

FIG. 4 is a flow chart illustrating a second embodiment of a process for producing a porous, carbon-containing preform according to the present invention. FIGS. 5A through 3I are views illustrating first, second, and third steps of FIG. 4.

Black areas, shown in FIGS. 5C through 5I, indicate that fibers carried by barbs of a needle at penetration of the needle create vertical cross-linked bonds between sheets of the unidirectional carbon fiber fabric, between the sheets of the unidirectional carbon fiber fabric and randomly-arranged-carbon-fiber fabric, and between the sheets of the unidirectional carbon fiber fabric and randomly-arranged-carbon-fiber fabric and sheets of the randomly-arranged-carbon-fiber fabric.

A second embodiment of the process is now described for producing a porous, carbon-containing. What distinguishes between the first and second embodiment is that the second embodiment has an intermediate layer between the body and friction layer. The intermediate layer has a density which is somewhere between two densities of the body and friction layer.

As shown in FIG. 4, the second embodiment includes a first step S21 of forming a body CL by needle-punching sheets C1 of unidirectional carbon fiber fabric, superposed on top of one another, a second step S22 of forming an intermediate layer ML on the body CL by alternately superposing the sheet of the unidirectional carbon fiber fabric and a sheet of randomly-arranged-carbon-fiber fabric on top of one another on the body CL and subsequently by needle-punching alternately-superposed sheets C1 and F1 of the unidirectional carbon fiber fabric and randomly-arranged-carbon-fiber fabric and the body CL, and a third step S23 of forming a friction layer FL on the intermediate layer ML by superposing sheets F1 of the randomly-arranged-carbon-fiber fabric on the intermediate layer ML and subsequently by needle-punching superposed sheets F1 of the randomly-arranged-carbon-fiber fabric and the intermediate layer ML.

The first step S21 is now described.

As shown in FIG. 5A, three (3) sheets C1 of the unidirectional carbon fiber fabric are superposed on top of one another.

As shown in FIG. 5B, during the needle-punching operation, the needle B penetrates superposed three (3) sheets C1 of the unidirectional carbon fiber fabric.

At penetration of the needle N, the barbs B of the needle N carry with them some fibers from each of the three (3) sheets C1 of the unidirectional carbon fiber fabric which the needle N penetrates. As a result, the fibers carried by the barbs B create vertical cross-linked bonds between the three (3) sheets C1, thereby forming the body CL. The body CL has a density of 0.1~1.0 g/cm$^3$.

As shown in FIG. 5C, the needle N, when moving up from the three (3) sheets C1 of the unidirectional carbon fiber fabric, is not clogged with the fibers. This is because the barbs B of the needle N are inclined downward.

The second step S22 is now described.

As shown in FIG. 5D, the one (1) sheet C1 of the unidirectional carbon fiber fabric and the one (1) sheet F1 of the randomly-arranged-carbon-fiber fabric are alternately superposed on top of one another on the body CL to form the intermediate layer ML on the body CL.

As shown in FIG. 5E, during the needle-punching operation, the needle N penetrates the one (1) sheet C1 of the unidirectional carbon fiber fabric, the one (1) sheet F1 of randomly-arranged-carbon-fiber fabric superposed on the one (1) sheet C1 of the unidirectional carbon fiber fabric, and the body CL consisting of the three (3) sheet C1 of the unidirectional carbon fiber fabric.

At penetration of the needle N, the barbs B of the needle N carry with them some fibers from each of the two (2) sheets C1 and F1 of the unidirectional carbon fiber fabric and randomly-arranged-carbon-fiber fabric, and the three (3) sheets C1 of the unidirectional carbon fiber fabric which the needle N penetrates. As a result, the fibers carried by the barbs create vertical cross-linked bonds between the two (2) sheets C1 and F1, thereby forming the intermediate later ML. Furthermore, the fibers carried by the barbs B create cross-linked bonds between the intermediate layer ML and body CL. The intermediate layer ML has a density of 0.1~0.8 g/cm$^3$.

The number of the sheets C1 and F1 of the unidirectional carbon fiber fabric and randomly-arranged-carbon-fiber fabric to be alternately superposed on top of one another depends upon the structure to be produced. So, either after a plurality of the sheets C1 and F1 of the unidirectional carbon fiber fabric and randomly-arranged-carbon-fiber fabric are alternately superposed on top of one another on the body CL, or each time the one (1) sheet C1 and one (1) sheet F1 are alternately superposed on top of one another on the body CL, the needle-punching may be carried out on alternately superposed sheets C1 and F1 and the body CL. The needle-punching may be carried out two or more times on the alternately superposed sheets C1 and F1 and the body CL.

As shown in FIG. 5F, the needle N, when moving up from the two (2) sheets C1 and F1 of the unidirectional carbon fiber fabric and randomly-arranged-carbon-fiber fabric and three (3) sheets C1 of the unidirectional carbon fiber fabric, is not clogged with the fibers. This is because the barbs B of the needle N are inclined downward.

The third step S23 is now described.

As shown in FIG. 5G, the two (2) sheets F1 of the randomly-arranged-carbon-fiber fabric are superposed on top of the proceeding one on the intermediate layer ML.

As shown in FIG. 5H, during the need-punching operation, the needle N penetrates the two (2) sheets F1 of the randomly-arranged-carbon-fiber fabric, the two (2) sheets C1 and F1 of the unidirectional carbon fabric and randomly-arranged-carbon-fiber fabric, and the three (3) sheets C1 of the unidirectional carbon fiber fabric.

At penetration of the needle N, the barbs B of the needle N carry with them some fibers from each of the two (2) sheets F1 of the randomly-arranged-carbon-fiber fabric which the needle N penetrates. As a result, the fibers carried by the barbs B create vertical cross-linked bonds between the two (2) sheets F1, thereby forming the friction FL. Furthermore, the fibers carried by the barbs B create cross-linked bonds between the friction layer FL and intermediate layer ML. The friction layer FL has a density of 0.01~0.5 g/cm$^3$.

As shown in FIG. 5I, the needle N, when moving up from the two (2) sheets F1 of the randomly-arranged-carbon-fiber fabric, and the two (2) sheets F1 and C1 of the unidirectional carbon fiber fabric and randomly-arranged-carbon-fiber fabric. This is because the barbs B of the needle N are inclined downward.

According to the present invention, it is through the needle-punching operation that the unidirectional carbon fiber fabrics and the randomly-arranged-carbon-fiber fabrics are formed into the body and the friction layer, respectively, and the friction layer is combined with the body in producing the porous, carbon-containing preform.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A process for producing a porous, carbon-containing preform being used in a brake disk, comprising:

superposing sheets of a first unidirectional carbon fiber fabric on top of one another;

needle-punching the superposed sheets of the first unidirectional carbon fiber fabric to form a body having a density of 0.8 to 1.0 g/cm$^3$;

alternately superposing a sheet of a second unidirectional carbon fiber fabric and a sheet of a first randomly-arranged-carbon-fiber fabric on top of the body;

needle-punching the alternately-superposed sheets of the second unidirectional carbon fiber fabric and the first randomly-arranged-carbon-fiber fabric, and the body together to form an intermediate layer on top of the body, the intermediate layer having a density of greater than 0.5 to less than 0.8 g/cm$^3$;

superposing sheets of a second randomly-arranged-carbon-fiber fabric on top of the intermediate layer;

needle-punching the superposed sheets of the second randomly-arranged-carbon-fiber fabric, the intermediate layer and the body together to form a frictional layer on top of the intermediate layer, the friction layer having a density of 0.01 to 0.5 g/cm$^3$.

2. The process for producing a porous, carbon-containing preform according to claim 1, wherein a needle having barbs formed around the needle is used in the needle-punching wherein the barbs are inclined downward in such a way that, when the needle-punching is performed, a portion of fibers from an upper sheet is carried over to a lower sheet, thereby creating vertical cross-linked bonds between the upper sheet and the lower sheet.

* * * * *